United States Patent
Drews et al.

(10) Patent No.: US 9,680,914 B1
(45) Date of Patent: Jun. 13, 2017

(54) SEAMLESS SERVICE MIGRATION UPDATES

(71) Applicant: Sprint Communications Company L.P., Overland Park, KS (US)

(72) Inventors: Gregory A. Drews, Marietta, GA (US);
Brian D. Farst, Hollywood, CA (US);
Young S. Lee, Ardmore, PA (US);
Raymond E. Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 354 days.

(21) Appl. No.: 14/465,833

(22) Filed: Aug. 22, 2014

(51) Int. Cl.
*G06F 15/16* (2006.01)
*H04L 29/08* (2006.01)

(52) U.S. Cl.
CPC .............. *H04L 67/06* (2013.01); *H04L 67/10* (2013.01)

(58) Field of Classification Search
CPC ................................. H04L 67/06; H04L 67/10
See application file for complete search history.

(56) References Cited

U.S. PATENT DOCUMENTS

| | | | | |
|---|---|---|---|---|
| 8,185,936 B1* | 5/2012 | Reeves | ................. | H04L 9/0891 713/168 |
| 8,301,141 B1* | 10/2012 | Reeves | ................... | H04W 4/16 455/411 |
| 8,463,239 B1* | 6/2013 | Koller | ............... | H04M 1/72519 455/410 |
| 2008/0215756 A1* | 9/2008 | Lee | .................. | H04L 29/12235 709/245 |

* cited by examiner

*Primary Examiner* — Krisna Lim

(57) ABSTRACT

A method of providing an update to a user mobile communication device, wherein the update comprises at least one new credential for a user mobile communication device following a change of a domain name related to a service, the method comprising changing the domain name, changing a state of an at least one old credential for the user mobile communication device used at the service to transient, granting access to the service to the user mobile communication device in response to a request for access using the at least one transient credential, determining if the user mobile communication device is in an acceptable environment to update to the at least one new credential and, when the user mobile communication device is in an acceptable environment, updating the user mobile communication device to the at least one new credential.

20 Claims, 8 Drawing Sheets

SEAMLESS SERVICE MIGRATION UPDATES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

On occasion, a company may want to change their domain name. While this is a simple enough thing to do, it can have ramifications. One issue will be with the various credentials that use the domain name as part of the credential. All the various users of various services of the company will have to have issued to them new credentials. These new credentials will have to be added to all the various user mobile communication devices and all the various caches in the various user mobile communication devices. Failure to execute this step cleanly can lead to numerous calls to a help desk, consuming time and money.

SUMMARY

In an embodiment, a method is disclosed of providing an update to a user mobile communication device, wherein the update comprises at least one new credential for the user mobile communication device following a change of a domain name related to a service, the method comprising creating at least one new credential for the user mobile communication device, changing the domain name, changing a state of an at least one old credential for the user mobile communication device used at the service to transient, granting access to the service to the user mobile communication device in response to a request for access using the at least one transient credential, determining if the user mobile communication device is in an acceptable environment to update to the at least one new credential, and, when the user mobile communication device is in the acceptable environment, then updating the user mobile communication device to the at least one new credential.

In another embodiment, a method of changing at least one credential each for a plurality of user mobile communication devices in response to a change from an old domain name to a new domain name, the method comprising creating at a server at least one new credential for the user mobile communication devices for accessing a service, changing the domain name, changing by the server the state of an at least one old credential for the user mobile communication device to transient, sending messages to the plurality of user mobile communication devices regarding the required change in the at least one credential per user mobile communication device, and, deleting each transient credential from the server only when the user associated with that credential has logged in with a new credential to replace the transient credential with regard to each of the user mobile communication devices.

In another embodiment, an apparatus is disclosed for temporarily granting access to a service after a domain name change in the service, the access granted to a user mobile communication device, the user mobile communication device able to access the service with at least one old credential previously valid and used to grant access for the user to the service via a wireless network, the apparatus comprising a memory, a processor, the service stored in the memory, the service requiring at least one valid credential to allow access by the user, and, an application stored in the memory that executes on the processor when the user mobile communication device submits the at least one old credential to the service to request access to the service, the processor then determines (1) if the at least one old credential was the most recently valid at least one credential prior to the domain name change, and (2) if the environment of the user mobile communication device is acceptable, and further wherein, when both of these conditions are met, the service then notifies the user to update to an at least one new credential.

In an embodiment, yet another method of changing a service access credential on a mobile communication device, wherein the changed service access credential reflects a change of a domain name of a service, is disclosed. The method comprises changing a domain name of a service and creating a new access credential for a mobile communication device, wherein the new access credential is associated with the service and wherein the new access credential comprises at least part of a new domain name of the service. The method further comprises storing the new access credential by the service and changing an old access credential of the mobile communication device stored by the service to a state of transient at the service, wherein the old access credential is associated with the service and wherein the old access credential comprises at least part of an old domain name of the service. The method further comprises granting access to the service to the mobile communication device in response to receiving a request from the mobile communication device for access to the service using the old access credential and determining that the old access credential stored by the service has a state of transient. The method further comprises, responsive to a determination that the old access credential stored by the service has a state of transient, determining that updating the mobile communication device to the new access credential cannot degrade current processing of the mobile communication device and, responsive to a determination that updating the mobile communication device to the new access credential cannot degrade current processing of the mobile communication device, updating the mobile communication device to store the new credential.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
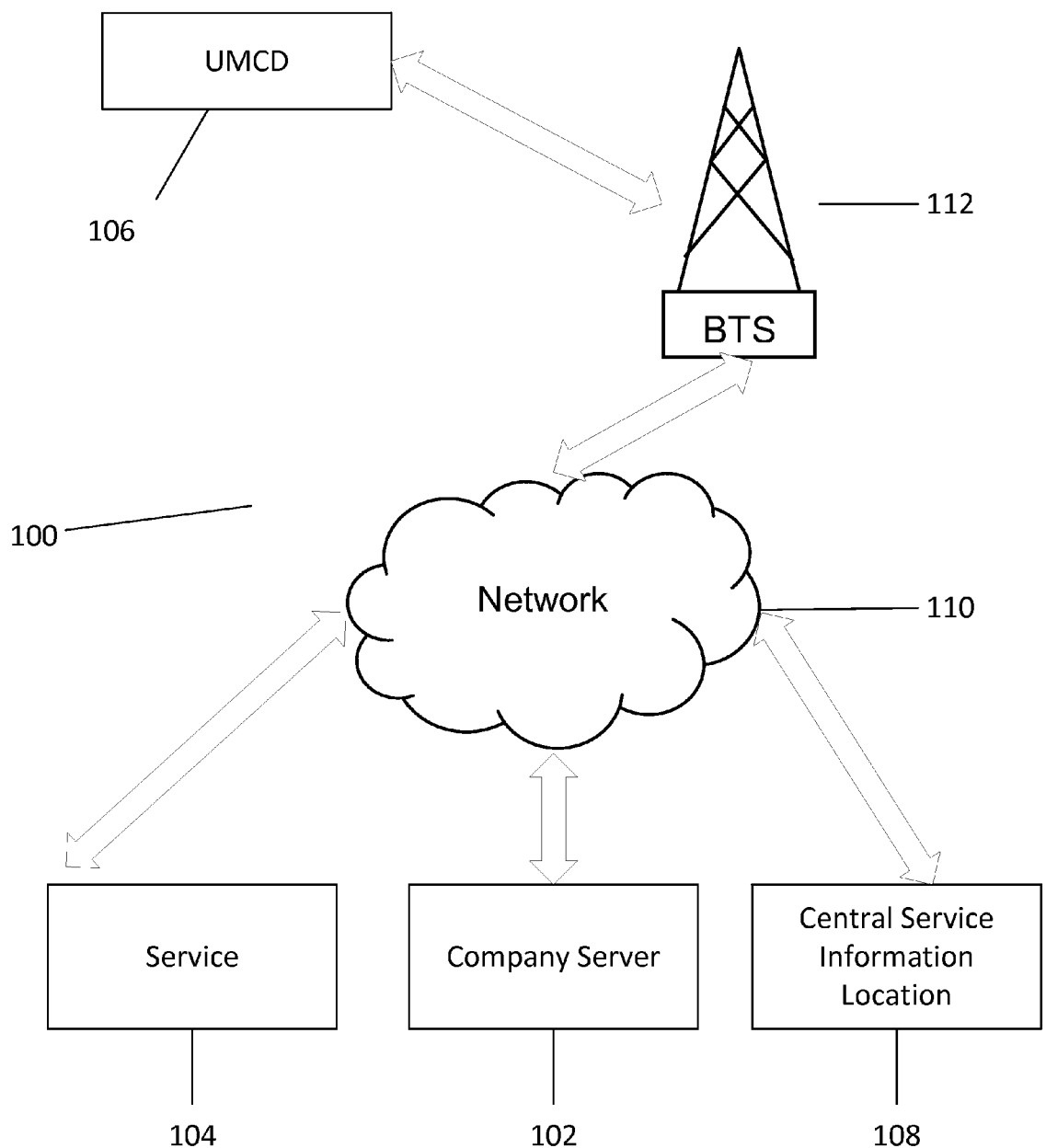
FIG. 1 is an illustration of an apparatus according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

On occasion, a company may want to change a domain name they are using. One of the challenges with making that change is the need to also change all the relevant credentials of users of the company's family of services on the user's various mobile communication devices. That is, some of the credentials may use the domain name as at least a portion of the credential. For example, it is quite common for a login credential to include an email address. So once the domain name changes, many of the related credentials may need to change as well. New credentials are created by the company, and the old ones may need to be deleted. Once these credentials are changed by the company, the new credentials need to be pushed out to the appropriate users and their mobile communication devices. These changes in credentials may go out over the air when one wants to make the changes in various user mobile communication devices. But sometimes the users are not in an environment that is acceptable for making these changes. For instance, the user and his mobile communication device may be in roaming mode, or in a foreign country, both of which can be expensive on a per-minute basis, and hence taking the time for downloading and updating is an unpalatable prospect for the user or the service provider at that time. Likewise, the user may have simply turned off the mobile communication device for an extended period of time, and it may not be available at the time of the pushing out. What then happens is that the next time the user attempts to log in with the old credentials, they are unable to get in, and may contact the Help Desk. Calling the Help Desk can be time consuming and a serious cost to the company. What is needed is a better way to deal with the transition from old credentials to new credentials, to allow for potentially reasonable delays in getting the new credentials onto the users' mobile communication devices.

One solution is to retain both the old and new credentials at a central service information location until all necessary changes have been made in the user mobile communication devices. Once the changes have been made to the user mobile communication devices, the old credentials can be deleted at the central service information locations. The credentials can be stored in at least a central service information location, as well other locations. The credentials may apply to a "family" of services. The family may be a group of unrelated services provided from a common source, or the services may be interrelated. Each user mobile communication device may have its own credential with regard to each service.

Credentials are used to authorize a user access to a service, while preventing unauthorized access to the service by others. A credential may comprise, for example, a user ID, a password, a time stamp, and a particular service or application it may be associated with. A credential may further comprise a state field that can have the value of either "transient" or "current." Hence, when a new credential is to be created, the old one will be assigned a state of "transient", and the new one will be assigned a state of "current". Both will be stored at the central service information location.

The process for making sure a user mobile communication device has the new credential added is to check the next time the user attempts to use a credential after the new credential has been created. A server associated with a service may check with the central service information location to see which credential is acceptable, and accept both the old and new credential. If the new credential is used by the user, the server may delete the old credential from the central service information location. If the old credential is used, the server will accept it, but it will also check the current execution environment of the user mobile communication device, to see if the new credential can be written to the mobile device without interfering with ongoing user activities. If no interference with ongoing user activities is expected, the new credential is loaded into the user mobile communication device, and the old credential is deleted from the central service information location. If replacing credentials at the current time would interfere with current user and/or mobile device activities, the old credential will be left in both the user mobile communication device and the central service information location. The next time the user tries to use the credential, the same check will be made again, and each subsequent time, until the new credential is found to be on the user mobile communication device, at which point the old credential will be deleted from the central service information location.

If a family of services uses the same credential, once the old credential has been deleted with respect to one service, it may likewise be deleted with regard to all the other services in the family. This may be accomplished by the fact that all the services look for credentials at the central services information location. Or, if they look for credentials in different locations, then by one service notifying the others about the change.

Referring now to FIG. 1, a schematic diagram of a system 100 is shown. A company server 102 is used to provide a service 104 to a user mobile communication device ("UMCD") 106. The company server 102 and the service 104 may be coupled to the UMCD via a link through a network 110, and then through a base transceiver station 112, or other well-known communication coupling method, such as an enhanced node B, etc. The base transceiver station 112 then communicates with the UMCD 106. The service 104 is an application that may be partially installed on the UMCD 106 and partially on the company server 102. This may be structured as a service client application on the UMCD 106 along with a service server application on the company server 102. In such an example, the service client application could make a request to the service server application, and the results received would be presented on the UMCD's 106 display.

Credentials may be stored in a central service information location 108 which is also coupled to the network 110. While shown here as being separate from the company server 102 and the service 104, in fact the central service information location 108 could be a part of either 102 or 104. The credentials could also be duplicated in more than one location, up to and including all three possible locations (102, 104 and separate 108).

Credentials are used to authorize a user's access to a service, while preventing unauthorized access to the service by others. If the company changes its domain name, it will also want to change the user's credentials. A credential may comprise, for example, a user ID, a password, a time stamp, and a particular service or application it may be associated with. A credential may further comprise a state field that can have the value of either "transient" or "current." Two credentials for the same service and the same UMCD 106 may exist at the same time and differ only in one having a state of transient and one having a state of current. Each UMCD that accesses a service may preferably have its own credential.

The company server 102 may be tied to more than one service 104, herein referred to as a "family" of services. The family may be a group of unrelated services provided from a common source, or the services may be interrelated. For instance, Google provides a large number of services that can all be accessed via a common set of credentials, including Gmail, Google+, Google Drive, etc. More than one UMCD 106 may be coupled to the one or more of a family of services 104. Each UMCD 106 will have its own credentials. One or more of the family of services 104 may be stored in a memory of each UMCD 106. The central service information location 108 could be commonly accessible to the entire family of services 104, or one or more of the family of services 104 may keep its credentials in a separate location. When a new credential is issued, it is placed with the old credential in the various places in which the old credential may currently reside. Once a credential has been successfully updated from old to new with regard to a service, the change is noted at the central service information location 108 as well as any other location where it may reside.

Figure 2:
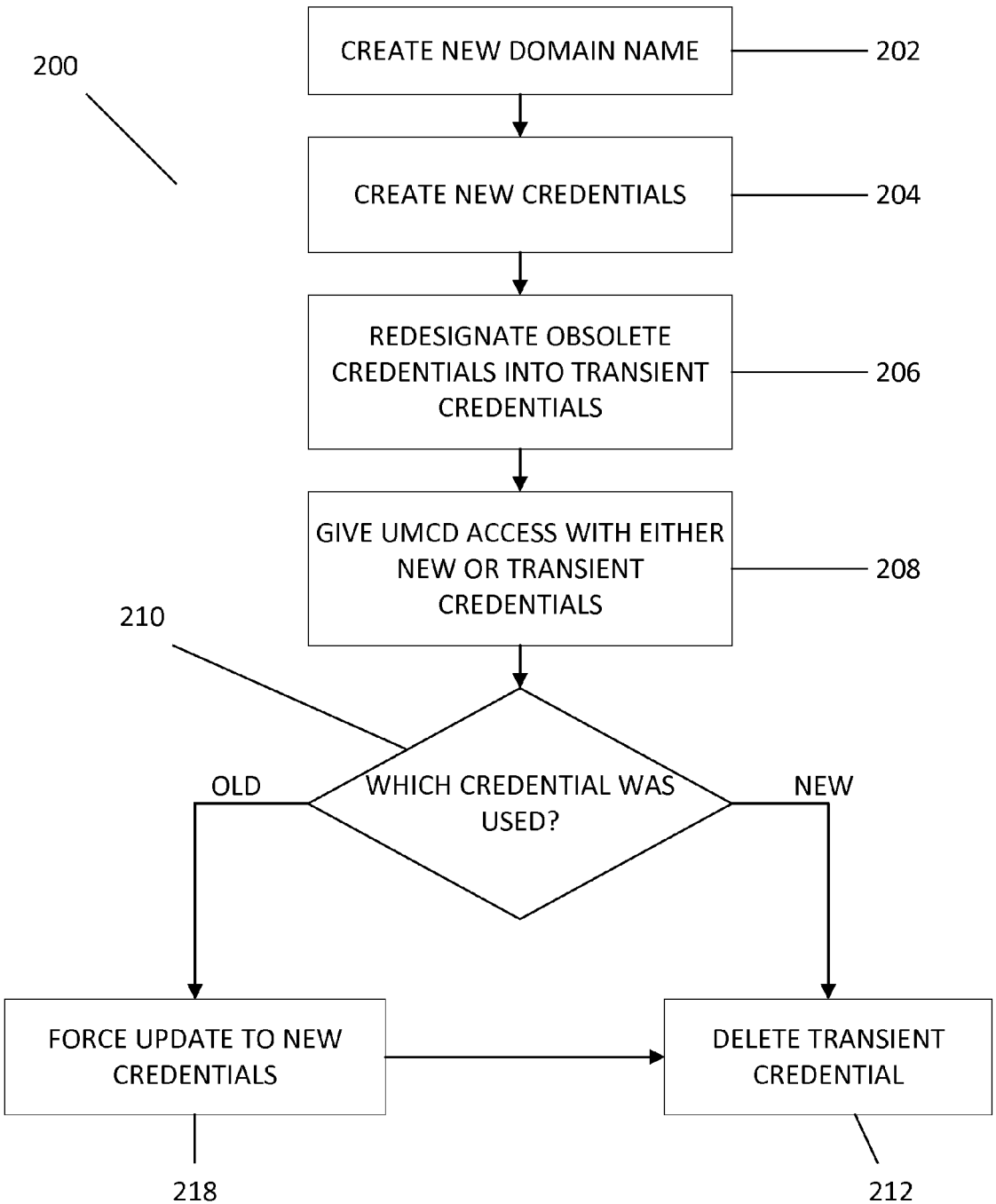
FIG. 2 is a schematic illustrating a method according to an embodiment of the disclosure.

Referring now to FIG. 2, a schematic diagram of a method 200 is shown. The company first creates 202 the new domain name. Once the new domain name is created, it is a straightforward matter for the company to create 204 the related new credentials of the affected users. These new credentials may be created in part by duplicating most of the existing credentials of the affected users. That is, a new credential could be created by copying an old credential, then changing at least one characteristic, called a "state". The state of the new one could be "current", while the old credential would change to a state of "transient". There may be only one credential that needs a new credential, or there may be multiple old credentials, such as different credentials for different services or multiple UMCDs. Once these new credentials are created, the old credentials are changed 206 to a state of transient. So now there are two differing credentials for the same service for the same UMCD, one that has a state of current, and one that has a state of transient. The credentials having a state of transient are preferably retained along with the new credentials at the central service information location. The various credentials may also be stored all together in multiple locations, or they may be stored in different locations. If desired, the company server may optionally send messages to the UMCDs at that time indicating the need to update to the new credentials with regard to all UMCDs and all services, and attempt to make the change in as many of the UMCDs as possible at that time.

When a user attempts to log in 208 with a particular UMCD with either the new or transient credential (e.g., a credential having a state of new or a state of transient) to a service, the credential submitted may be checked first against either the new or transient credentials, and then if it does not match that one, checked against the other. If the log in request uses either of these credentials, the login is allowed. The service then makes a query 210, which credential was used? If it was the new one, then the transient credential is deleted 212. If the transient credential was used to attempt the login, the service may then attempt to 218 update the UMCD 106 to the new credential, and then delete 212 the transient credential. This updating may be accomplished by having the service go into the various places in which the credential is stored in the user's mobile communication device and change it there.

This method 200 could be repeated for each credential and for each service that the UMCD contacts, changing them one at a time. Alternatively, if a plurality of services are related to each other as a family of services and use a common credential, once the new credential is in place for one service, that service may notify the other services in the family, so they all will know and use the new credential. Or, the family may use the central service information location as a common source for storage of the credentials, and hence all the services will automatically be using the new credentials once it is established on the UMCD. The required change to each UMCD may be attempted the first time each UMCD tries to access a service, until all the UMCDs have had their new credentials inserted.

It may be preferable to only update the credentials when the UMCD is in an acceptable environment. Environment means the situation and location of the UMCD, especially looking at how much it will cost to require the user or the communication service provider to update the credentials in the UMCD, and how difficult and time-consuming it will be, and if the UMCD is even operating at the time. What is an "acceptable" environment could be determined by the company in each instance. It may be that some credentials update much more quickly and easily than others, and so what could be acceptable could be broader.

Figure 3:
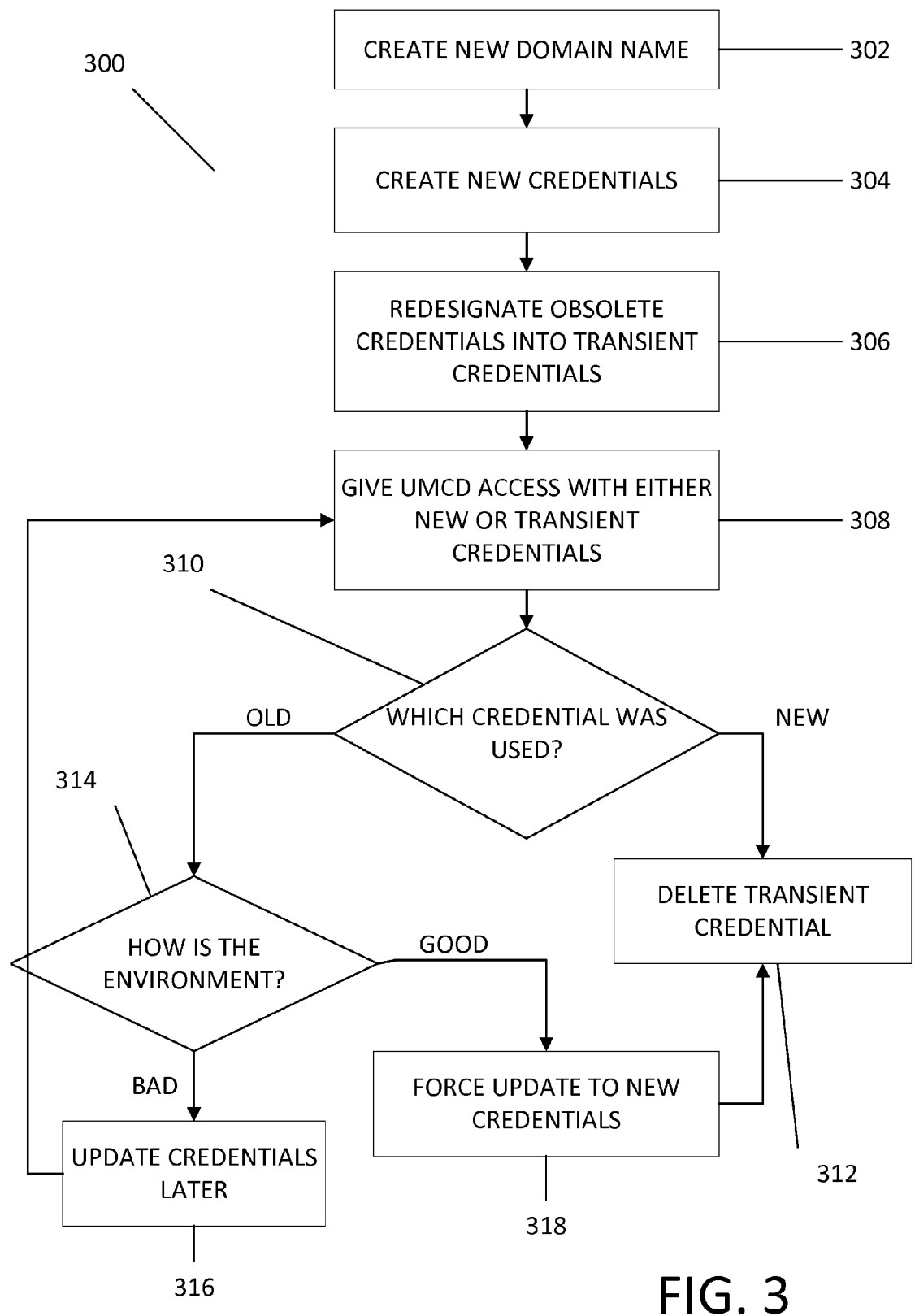
FIG. 3 is a schematic illustrating another method according to an embodiment of the disclosure.

Referring now to FIG. 3, a schematic diagram of a method 300 is shown. The company first creates 302 the new domain name. Once the new domain name is created, the company then creates 304 the related new credentials. There may be only one credential to create, or there may be multiple new credentials to create. Once the new credentials are created, the state of the old credentials is changed 306 to a state of "transient." These transient credentials may be retained along with the new credentials at the central service information location. They may all be stored in the same location, or all together in multiple locations, or they may be stored in different locations. When a user attempts to log in 308 with either the new or transient credentials to a service, the login is allowed.

The service then makes a first query 310, which credential was used? If it was the new one, then the transient credential is deleted 312. If the transient credential was used, then a second query 314 is made. How is the environment of the UMCD? The environment may refer to a collection of factors that indicate whether this would be an acceptable time, place and situation to update the credentials on the UMCD. Such factors may include the physical location of the UMCD, such as which country, or is it in a location that requires roaming. Another factor may be the quality of a connection to the network the UMCD has. Another factor may be the total volume of traffic over the network at that time. The service may look at these or other factors to decide if the UMCD is in an acceptable environment for updating credentials. When the environment is acceptable, then the service updates 318 the UMCD to the new credential, and then the transient credential are deleted 312 from the central information service location. Thereafter, the service will only accept the new credential for access. If the environment is unacceptable, the user is still allowed access 316, and the transient credential will be retained at the central service information location for the time being. The next time the user attempts to log in 308 to the service, the same query 310 will be made. This method could be repeated for each service that the UMCD contacts, changing them one at a time. Alternatively, a family of services could use a common source for credentials, such as a central service information location, and thereby note that for this UMCD the credential is changed with regard to all services. Or, once the new credential is in place for one service, that service may notify the other services of the family, so they all will know and use the new credential and delete the old credential. Each UMCD will have to have its own credentials changed with regard to each service.

Figure 4:
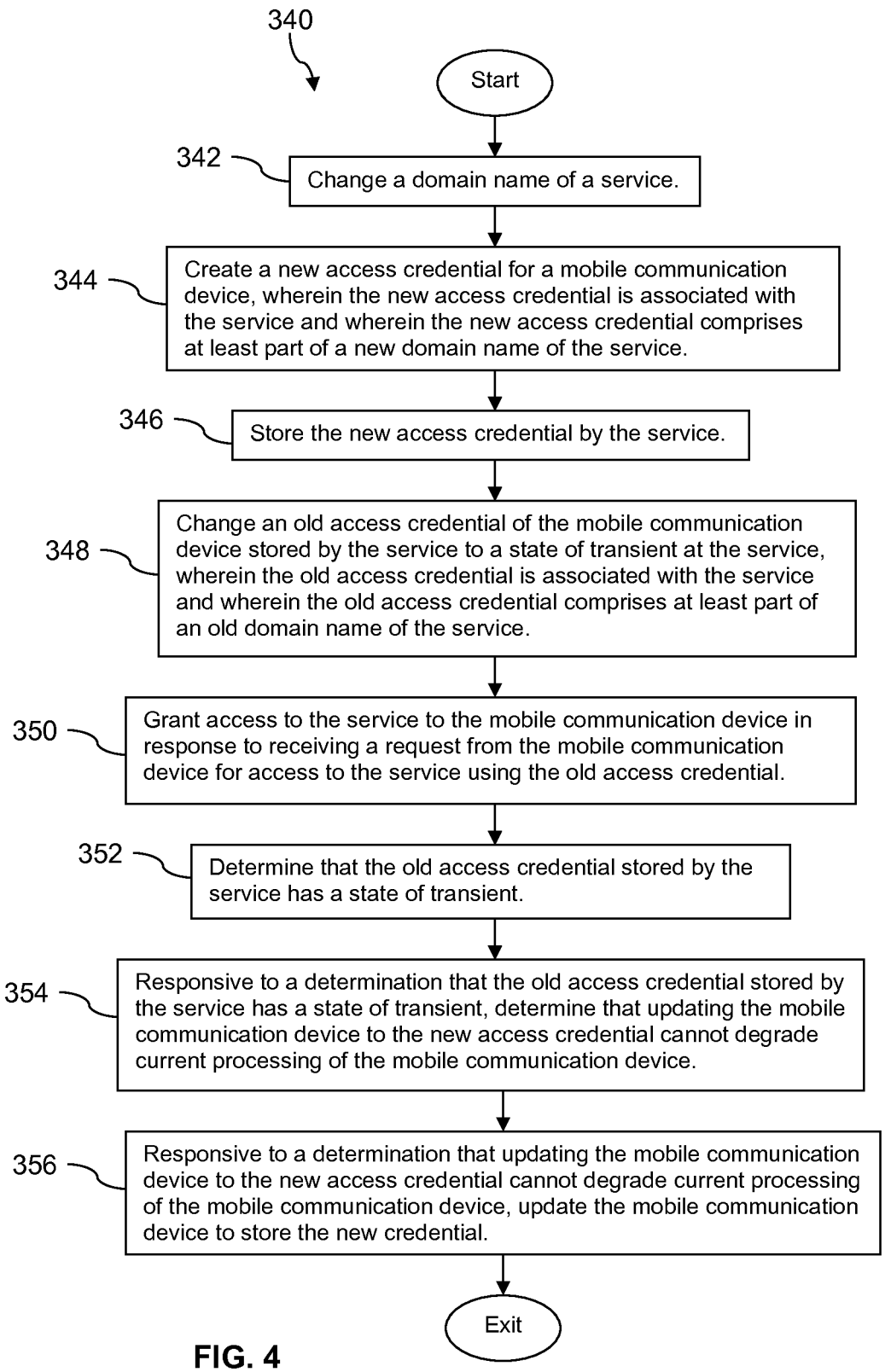
FIG. 4 is a flow chart of yet another method according to an embodiment of the disclosure.

Referring now to FIG. 4, a method 340 is shown. At block 342, change a domain name of a service. At block 344, create a new access credential for a mobile communication device, wherein the new access credential is associated with the service and wherein the new access credential comprises at least part of a new domain name of the service. At block 346, store the new access credential by the service. At block 348, change an old access credential of the mobile communication device stored by the service to a state of transient at the service, wherein the old access credential is associated with the service and wherein the old access credential comprises at least part of an old domain name of the service.

At block 350, grant access to the service to the mobile communication device in response to receiving a request from the mobile communication device for access to the service using the old access credential. At block 352, Determine that the old access credential stored by the service has a state of transient. At block 354, responsive to a determination that the old access credential stored by the service has a state of transient, determine that updating the mobile communication device to the new access credential cannot degrade current processing of the mobile communication device. At block 356, responsive to a determination that updating the mobile communication device to the new access credential cannot degrade current processing of the mobile communication device, update the mobile communication device to store the new credential.

Figure 5:
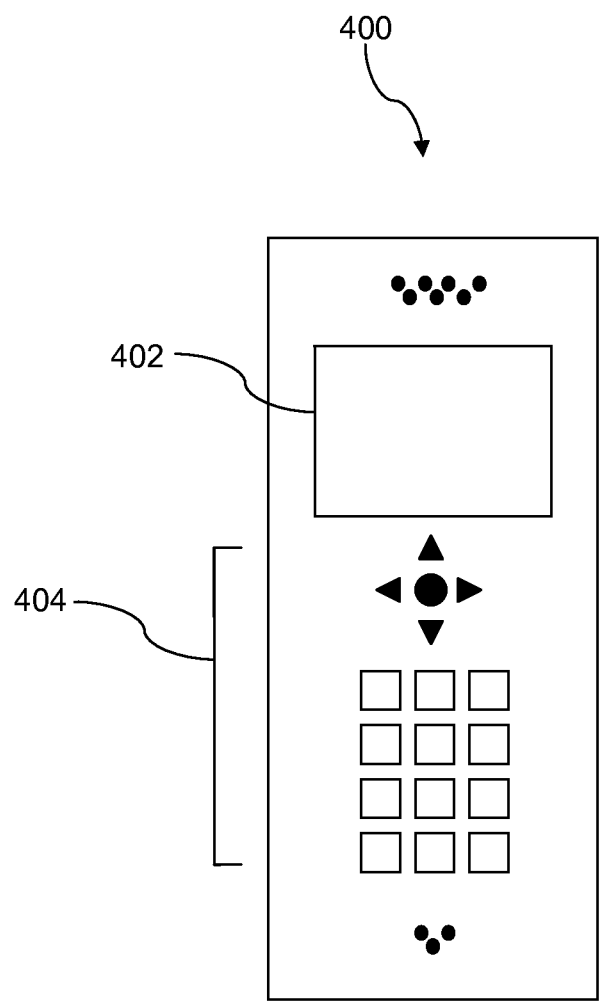
FIG. 5 is an illustration of a mobile communication device according to an embodiment of the disclosure.

FIG. 5 depicts a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
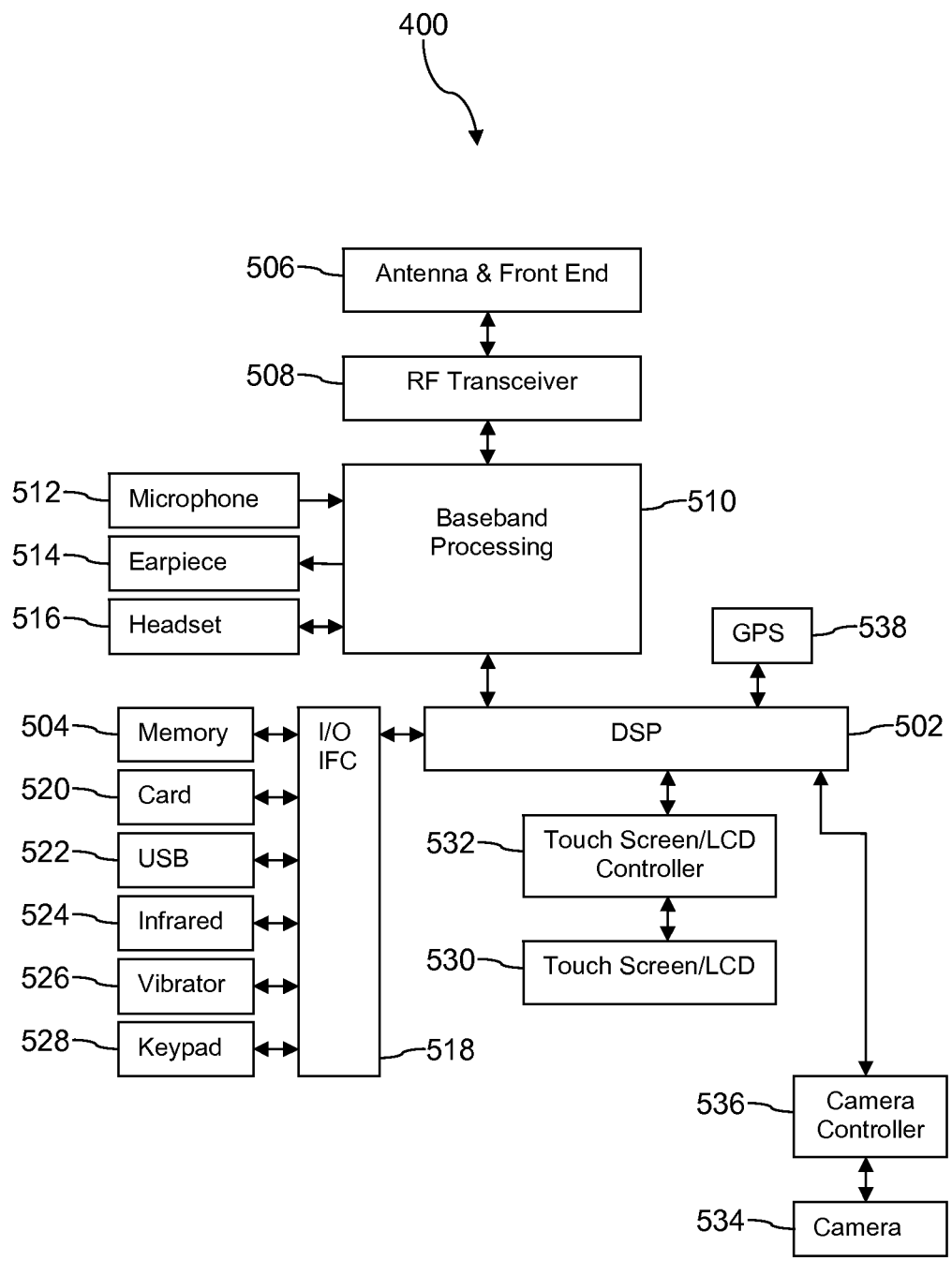
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
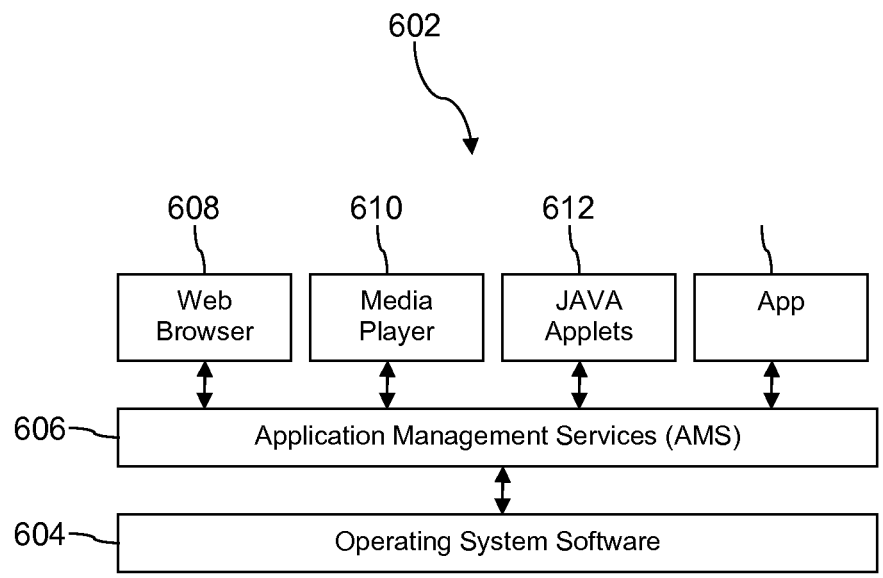
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
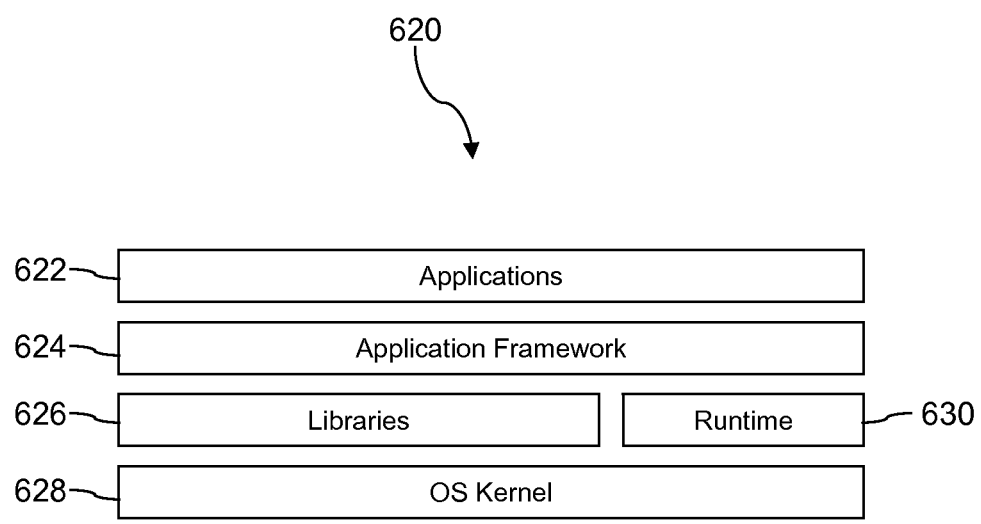
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
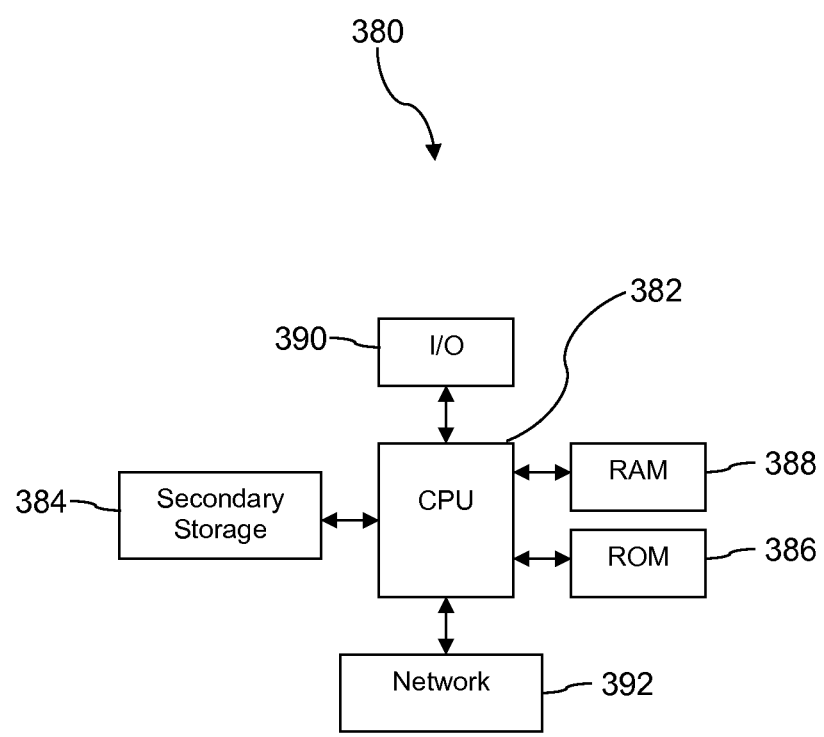
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. A method of changing a service access credential on a mobile communication device, wherein the changed service access credential reflects a change of a domain name of a service, the method comprising:
  changing a domain name of a service;
  creating a new access credential for a mobile communication device, wherein the new access credential is associated with the service, and wherein the new access credential comprises at least part of a new domain name of the service;

storing the new access credential by the service;

changing an old access credential of the mobile communication device stored by the service to a state of transient at the service, wherein the old access credential is associated with the service, and wherein the old access credential comprises at least part of an old domain name of the service;

granting access to the service to the mobile communication device by a server associated with the service in response to receiving a request from the mobile communication device for access to the service using the old access credential;

determining, by the server, that the old access credential stored by the service has a state of transient;

responsive to a determination that the old access credential stored by the service has a state of transient, determining, by the server, that updating the mobile communication device to the new access credential cannot degrade current processing of the mobile communication device; and responsive to a determination that updating the mobile communication device to the new access credential cannot degrade current processing of the mobile communication device, updating the mobile communication device to store the new access credential.

2. The method of claim 1, further comprising:

determining that the mobile communication device is updated with the new access credential; and responsive to the determination that the mobile communication device is updated with the new access credential, deleting, by the server, the old access credential from the service.

3. The method of claim 2, further comprising determining that the new access credential has been installed on the mobile communication device by receiving a request for service from the mobile communication device that includes the new access credential.

4. The method of claim 1, wherein the service is a member of a family of services, the method further comprising deleting, by the server, the old access credential at a central service information location with regard to all members of the family of services.

5. The method of claim 1, wherein the service is a member of a family of services, the method further comprising notifying, by the service, other members of the family of services of the new access credential.

6. The method of claim 1, wherein the service is a member of a family of services, and wherein the new access credential is updated at a central service information location which a plurality of members of the family of services access to look up credentials.

7. The method of claim 1, further comprising removing, by the server, the old access credential from the mobile communication device.

8. The method of claim 1, wherein the new access credential is at least partially composed of the domain name.

9. The method of claim 1, further comprising analyzing, by the server, an environment of the mobile communication device, and wherein the mobile communication device is updated to store the new access credential responsive to the environment being determined to be acceptable based on the analysis.

10. The method of claim 9, wherein the environment of the mobile communication device is determined to be acceptable when the mobile communication device is not engaged in roaming.

11. The method of claim 9, wherein the environment of the mobile communication device is determined to be acceptable based on a location of the mobile communication device.

12. The method of claim 9, wherein the environment of the mobile communication device is determined to be acceptable based on a quality of a network connection of the mobile communication device.

13. A method of changing at least one credential for each of a plurality of user mobile communication devices in response to a change from an old domain name to a new domain name, the method comprising:

creating at a server at least one new credential for a user mobile communication device for accessing a service;

changing a domain name of the service;

changing, by the server, at least one old credential for the user mobile communication device to a state of transient;

sending messages to the plurality of user mobile communication devices regarding the change in the at least one old credential for the user mobile communication device; and deleting, by the server, each credential that has a state of transient from the server only when a user associated with that credential has logged in with a new credential to replace the credential that has a state of transient with regard to each of the plurality of user mobile communication devices.

14. The method of claim 13, wherein the plurality of the user mobile communication devices have more than one credential to change.

15. The method of claim 13, wherein the at least one new credential is updated at a central service information location, which all members of a family of services access.

16. The method of claim 13, further comprising analyzing an environment of each of the plurality of user mobile communication devices during log in, and when the environment is determined to be acceptable based on the analysis, then forcing each of the plurality of user mobile communication devices to make the change to the new credential.

17. The method of claim 16, wherein the environment of each of the plurality of user mobile communication devices is determined to be acceptable when a corresponding user mobile communication device is not engaged in roaming.

18. The method of claim 13, further comprising analyzing an environment of each of the plurality of user mobile communication devices during log in, and when the environment is determined to be not acceptable based on the analysis, then allowing a user of each of the plurality of user mobile communication devices to decide whether to make the change to the new credential at that time.

19. The method of claim 13, wherein the at least one new credential is related to a family of services, the method further comprising notifying, by the service, other members of the family of services to delete the at least one old credential and to add the at least one new credential.

20. The method of claim 13, wherein the at least one new credential is at least partially composed of the domain name.

* * * * *